United States Patent [19]
Wada et al.

[11] Patent Number: 5,792,406
[45] Date of Patent: Aug. 11, 1998

[54] METHOD OF PREPARING SPHERICAL MOLDINGS

[75] Inventors: Takuya Wada, Mishima-gun; Masahiro Nakaizumi; Shoji Sakakiyama, both of Shinnanyo, all of Japan

[73] Assignees: Sekisui Kagaku Kogyo Kabushiki Kaisha, Osaka; Japan Immuno Research Laboratories, Co., Ltd., Gunma, both of Japan

[21] Appl. No.: 637,796

[22] PCT Filed: Sep. 19, 1995

[86] PCT No.: PCT/JP95/01857

§ 371 Date: May 3, 1996

§ 102(e) Date: May 3, 1996

[87] PCT Pub. No.: WO96/09156

PCT Pub. Date: Mar. 28, 1996

[30] Foreign Application Priority Data

| Sep. 21, 1994 | [JP] | Japan | 6-226762 |
| Oct. 18, 1994 | [JP] | Japan | 6-252003 |
| Dec. 16, 1994 | [JP] | Japan | 6-313117 |
| Jan. 26, 1995 | [JP] | Japan | 7-010507 |
| Jan. 26, 1995 | [JP] | Japan | 7-010508 |
| Apr. 18, 1995 | [JP] | Japan | 7-092332 |

[51] Int. Cl.$^6$ .................... B28B 11/12; B29C 45/12; B29C 45/32

[52] U.S. Cl. .................. 264/157; 264/297.2; 264/297.8; 264/328.8; 425/588

[58] Field of Search .................. 264/157, 297.7, 264/297.8, 328.8; 425/588

[56] References Cited

U.S. PATENT DOCUMENTS

| 2,335,294 | 10/1943 | Meyer | 264/297.8 |
| 5,525,279 | 6/1996 | Yamazaki et al. | 264/49 |

FOREIGN PATENT DOCUMENTS

| 54-100969 | 7/1979 | Japan . |
| 55-67827 | 5/1980 | Japan . |
| 58-87029 | 5/1983 | Japan . |
| 59-53919 | 4/1984 | Japan . |
| 60-104645 | 6/1985 | Japan . |
| 61-247038 | 10/1986 | Japan | 425/588 |
| 2-131912 | 5/1990 | Japan . |

*Primary Examiner*—Jan H. Silbaugh
*Assistant Examiner*—Edmund H. Lee
*Attorney, Agent, or Firm*—Armstrong, Westerman, Hattori, McLeland & Naughton

[57] ABSTRACT

A method which makes it possible to simultaneously injection-mold a number of spherical moldings without causing increase of runner loss, and is a method of preparing spherical moldings by coupling molding forming parts with each other through a bridge of 0.1 to 10 mm$^2$ in sectional area for feeding molten resin, arranging a structure in which a plurality of molding forming parts are coupled with each other through the aforementioned bridge with respect to one gate, and performing molding, thereby obtaining a sphere series in which a plurality of spherical moldings are coupled with each other through a bridge part.

9 Claims, 8 Drawing Sheets

METHOD OF PREPARING SPHERICAL MOLDINGS

TECHNICAL FIELD

The present invention relates to a method of preparing a plurality of spherical moldings, and more particularly, it relates to a method of preparing spherical moldings comprising a step of making it possible to obtain a sphere series formed by coupling a plurality of moldings with each other by injection molding.

BACKGROUND TECHNIQUE

In general, various methods of forming moldings in a multiple manner are proposed in order to improve productivity in injection molding. For example, Japanese Patent Laying-Open No. 58-87029 discloses a method of coupling a number of gates for supplying molten resin to molding forming parts to a runner of a molding machine, thereby enabling simultaneous forming of a number of moldings.

In such a forming method, however, a forming part for obtaining one molding is coupled to one gate. In case of obtaining a number of moldings by single forming, the number of the gates must have been inevitably increased in response to the number of the moldings. Consequently, the volume of the runner with which the gates are connected must have been inevitably increased due to the increase of the number of the gates.

In injection molding of a quantity of moldings, therefore, runner loss has been increased and the molding efficiency has not been much improved, although the molding time can be reduced. As the moldings to be obtained are reduced in size, the volume of the runner is increased with respect to that of the moldings, and hence reduction of the molding efficiency caused by the aforementioned increase of the runner loss has remarkably appeared.

To this end, a method of employing a hot runner or a mini hot runner is proposed as a method of reducing the runner loss, as disclosed in Japanese Patent Laying-Open No. 2-131912. In the method described in this prior art employing a hot runner or a mini hot runner, however, multiple taking has been so limited that only about several 10 moldings have been simultaneously formable. Namely, it has been impossible to simultaneously form more moldings such as hundreds or thousands of them.

In moldings obtained in such a multiple manner, further, a plurality of moldings are taken out from a metal mold in a coupled state. When spherical moldings are obtained in a multiple manner, for example, a sphere series in which spherical moldings are coupled with each other in a point or line contact manner is taken out from the metal mold.

Therefore, it has been necessary to separate the sphere series into the individual spherical bodies after the forming, in order to obtain the individual spherical bodies. As a method of separating such a sphere series into individual spherical bodies, (1) a method of parting the individual spherical bodies one by one from the sphere series with a cutting tool such as a cutter or scissors, or (2) a method of introducing the sphere series into a mortar and thereafter push-cutting the same with a pestle thereby parting the same into individual spherical bodies has been employed.

In each of the aforementioned parting method employing a cutter or scissors and the method of parting the sphere series in a mortar with a pestle, however, the operation of parting the sphere series into the individual spherical bodies has been troublesome. Namely, it has been difficult to continuously and efficiently part a large amount of sphere series into individual spherical bodies.

For the spherical moldings, further, provision of fine textures on the surfaces is required depending on the use. In order to provide such textures, various polishing methods have been proposed in general.

As a method of polishing materials such as synthetic resin, fiber reinforced resin, ceramics and metals, Japanese Patent Laying-Open No. 58-192741 discloses a spherical body working apparatus consisting of a spherical guide table and a rotary grindstone which is opposed to its guide way for arranging spherical bodies to be worked in the aforementioned guide way on guide grooves provided on the guide way and grinding the aforementioned spherical bodies with the rotary grindstone, for example.

Further, Japanese Patent Laying-Open No. 1-164551 discloses a spherical body working apparatus of holding workpieces in a working space between a pair of polishing bodies which are provided to be vertically opposed to each other and holding the same in a pressure holding state while rotating at least one polishing body thereby polishing spherical bodies, for example.

In addition, Japanese Patent Laying-Open No. 2-237753 discloses a spherical body working method of holding worked spherical bodies by a discoidal lower lap and a discoidal upper lap which is eccentrically provided with respect to this lower lap and rolling the same thereby polishing the spherical bodies and an apparatus therefor, for example.

In each of the aforementioned apparatuses, however, a liquid such as a working fluid or a polishing liquid is fed at the time of polishing for making continuous working while washing out chips caused by the polishing, while the aforementioned liquid may not be employable depending on the materials of the workpieces and the objects of employment, and there has been such a problem that the meshes of the grindstone are clogged with the polishing chips and the working is disabled in this case. When polishing is made without employing the aforementioned liquid, further, a dressing treatment for reproducing the meshes of the grindstone must be performed every time a constant amount of workpieces are polished, and hence there has been such a problem that the frequency of the dressing treatment is increased to remarkably reduce production efficiency.

On the other hand, a treatment with a ball mill, barrel polishing, a sandblast treatment, transfer and the like are also employed as methods of forming texture patterns on surfaces of spherical bodies, in addition to the aforementioned polishing with a grindstone.

The aforementioned treatment with a ball mill is a method of filling up a pot with workpieces and polishing balls (at least 1 mm in diameter) and rotating the pot, thereby colliding the balls with the workpieces and crushing the same (Japanese Patent Laying-Open No. 60-104645).

Further, the degree of surface working of the workpieces can be adjusted by changing the hardness and surface roughness of the aforementioned balls, while flashes etc. adhering to the workpieces can be removed by changing polishing conditions.

The aforementioned barrel polishing is a method of mixing fine powder with a fluid such as water or oil, forcibly stirring the same and colliding the fine powder with workpieces for making surface working. The difference between this method and the ball mill treatment resides in that this method is carried out by fixing the workpieces (Japanese Patent Laying-Open No. 57-184665).

The aforementioned sandblast treatment is a method of mixing sandy polishing powder or the like with a fluid such as air of water and spraying the same to workpieces at a high pressure for making surface working. The degree of the surface working can be adjusted by the grain size of the polishing powder, the spraying pressure and the like.

The aforementioned transfer is a method of pressing workpieces against a mold having prescribed shape and degree of surface working, for transferring the surface shape of the mold.

In each of the aforementioned methods, the degree of surface working is adjusted by the treatment time, the pressure for the pressing, hardness size of the workpieces and the like.

In the surface working with a ball mill, however, there have been such problems that the workpieces are lodged between the balls and not worked when the same are reduced in size, and the workpieces are crushed by the weight and rotation of the balls.

In the aforementioned sandblast treatment and barrel polishing, there have been such problems that working becomes difficult when the amount of treatment is small or the workpieces are small-sized since the workpieces are fixed to be worked, and working of overall surfaces cannot be made unless the treatment is carried out at least twice since the worked portions cannot be treated.

In case of the aforementioned transfer, clogging may be caused similarly to the grindstone depending on the properties of the workpieces, and the sizes of the workpieces must be homogeneous.

On the other hand, various materials have been generally employed as carriers for adsorbing components of a body fluid such as blood and carriers employed in mucilage diagnostic medicines. In separation of granular spheres from blood, for example, nylon fiber, polyester fiber or silicone-treated glass wool is employed as a material for selectively sticking the granular spheres (Japanese Patent Laying-Open No. 54-46812, Japanese Patent Laying-Open No. 57-11920 or the like).

In the method of selectively adsorbing the components in the body fluid in the aforementioned manner, the surface areas of the carriers are maximized thereby improving absorbability. Therefore, fiber is mainly employed as the carriers.

However, it has been recognized that the absorbability cannot be sufficiently improved by simply increasing the absorption areas of the carriers depending on the components, and sufficient absorbability is first attained when the carriers are formed to have specific surface roughness (Japanese Patent Laying-Open No. 5-168706).

To this end, Japanese Patent Laying-Open No. 5-168706 discloses (1) a method of mechanically polishing a carrier material, as a method of providing carriers with specific surface roughness. As other methods of providing carriers with specific surface roughness, (2) a method of bonding or sticking and fixing fine grains to surfaces of carriers, (3) a method of employing a porous material whose surface coincides with specific surface roughness, and the like are also proposed.

However, (1) there have been such disadvantages in the polishing method that the same is merely a method which is applicable to only particulate carriers, and its application range is narrow. In addition, there has also been such a disadvantage that chips result from polishing and hence a trouble operation for removing such polishing chips is forced.

Further, (2) also in the method of fixing the fine grains to the carriers, fine grains which have not been fixed to the carriers are similarly caused and hence a troublesome operation of removing such fine grains is forced. In addition, some adhesive or sticker must be employed for fixing the fine grains to the carriers, and there have been such problems that the fine grains are denatured by the adhesive or the sticker, and interaction between a specimen sample and the adhesive material results.

In addition, (3) there has been such a disadvantage that restriction on the material is large in the method of employing a porous material. Namely, there has been such a disadvantage that the selection range of the material is extremely limited when a porous material which coincides with specific surface roughness is to be obtained.

OBJECTS OF THE INVENTION

A principal object of the present invention is to provide a method of preparing spherical moldings which overcomes the disadvantages of the conventional multiple injection molding methods and can simultaneously mold a large quantity of spherical moldings without causing increase of runner loss, to be thereby capable of effectively improving molding efficiency.

Another object of the present invention is to provide a method of preparing spherical moldings comprising a step of making it possible to efficiently and reliably separate a large quantity of sphere series obtained by injection molding.

Still another object of the present invention is to provide a method of preparing spherical moldings comprising a working step which can grind spherical moldings without employing a liquid such as a working fluid or a polishing liquid and remarkably reduce the number of times of a dressing treatment removing grinding chips.

A further object of the present invention is to provide a method of preparing spherical moldings comprising a working step which is capable of grinding various spherical moldings having different sizes with no requirement for a dressing treatment upon grinding with no employment of a liquid such as a working fluid or a polishing liquid and no breaking of the spherical moldings by weight of balls, impacts or the like.

A further object of the present invention is to provide a method of preparing spherical moldings comprising a step which can efficiently separate spherical moldings from an abrasive with relatively simple equipment in high accuracy.

A further object of the present invention is to provide a method which hardly causes polishing chips and fine grains and hence can omit a troublesome removing operation for polishing chips and fine grains, and is capable of reliably preparing spherical moldings having target surface roughness from wide-ranging materials without employing a material for fixation.

A further object of the present invention is provide spherical moldings as carriers for adsorbing components of a body fluid such as blood or carriers employed for immunodiagnostic reagents having target surface roughness from wide-ranging materials without employing a material for fixation.

DISCLOSURE OF THE INVENTION

The invention disclosed in claim 1 is a method of injection-molding a plurality of spherical moldings in a multiple manner, which is a multiple injection molding method characterized in that a bridge of 0.01 mm$^2$ to 10 mm² in sectional area for allowing flow of molten resin between molding forming parts for performing injection molding while connecting a plurality of molding forming parts which are coupled with each other through the said bridge to one gate linked with at least one runner.

Namely, the multiple molding method of the invention described in claim 1 is characterized in that the bridge of the aforementioned specific sectional area is arranged between the molding forming parts for performing molding, and a plurality of molding forming parts are coupled to one gate which is connected to at least one runner through the aforementioned bridge. In the injection molding method of the invention described in claim 1, therefore, a plurality of molding forming parts are coupled to one gate through the aforementioned bridge, whereby a plurality of spherical moldings are formed from the plurality of molding forming arts which are connected to one gate. A bridge part of 0.1 to 10 mm² in sectional area is formed by hardening of molten resin which is injected into the aforementioned bridge, whereby the spherical moldings are taken out in a state coupled with each other by the bridge part, i.e., in a state of a sphere series. Such a bridge part is removed after the molding by separating the moldings from each other.

As to the number of coupling of the spherical moldings by the aforementioned bridge part, the maximum coupleable quantity is decided by various conditions such as the sectional area of the bridge, the length, flowability of the resin, the molding temperature and the like. Considering the flowability of the resin and an operation required for the separation after the molding, the sectional area of the bridge is desirably set at 0.01 mm² to 10 mm² as hereinabove described, and preferably about 0.09 mm² to 1 mm². In order to improve molding weight efficiency and to arrange the largest possible number of moldings within a constant magnitude of a metal mold, the length of the bridge is preferably set to be about not more than 10 mm.

In the injection molding method of the invention described in claim 1, the gate and the runner may be arranged only on one side of the plurality of molding forming parts which are coupled through the bridge, while gates may be arranged on both sides so that the resin is poured from both sides, whereby the resin can be reliably and quickly poured into all forming parts even in case of coupling a larger number of molding forming parts.

A hot runner or a mini hot runner may also be employed in the invention described in claim 1, as a matter of course.

In the injection molding method of the invention described in claim 1, the bridge of the aforementioned specific sectional area is interposed between the molding forming parts. Therefore, the resin which is injected from one gate is poured into the plurality of forming parts which are coupled with each other through the aforementioned bridge, so that a plurality of spherical moldings which are coupled with each other through a bridge part based on the resin hardened in the bridge are taken out at once. Thus, a number of spherical moldings can be molded at once without causing runner loss, by increasing the number of coupling of the aforementioned forming parts.

In case of molding 64 spherical moldings at once, for example, the runner must have been connected with each of 64 molding forming parts through a gate in the conventional method. Therefore, at least 64 gates have been connected with the runner. In the present invention, on the other hand, the molding forming parts are coupled with each other by the aforementioned bridge, whereby the runner may simply be connected with 32 gates in case of obtaining a sphere series in which two spherical moldings are coupled with each other through a bridge part, for example. In case of molding a sphere series in which eight spherical moldings are coupled with each other through a bridge, the runner may simply be connected with eight gates. Thus, runner loss can be efficiently reduced.

The invention described in claim 2 is characterized by further comprising a step of parting the sphere series obtained in the aforementioned invention described in claim 1. Namely, in the invention described in claim 2, the said step of parting the sphere series is carried out by employing first and second rollers having different rotation speeds and a feeder for supplying the sphere series between the aforementioned first and second rollers, supplying the sphere series between the first and second rollers by the said feeder, bringing the said sphere series into contact with the first and second rollers having different rotation speeds and parting the said sphere series into individual spherical moldings.

With the sphere series parting apparatus in the invention described in claim 2, the sphere series is supplied between the first and second rollers from the feeder, so that the sphere series is parted into individual spherical moldings by the outer peripheral surfaces of the first and second rollers since the rotation speeds of the first and second rollers are different from each other. In this case, proper cylindrical rollers can be employed as the first and second rollers so far as the same are rotated at different rotation speeds, while proper rotation/driving means such as a motor is employed for rotating/driving the rollers. Further, a proper feeder is employed as the aforementioned feeder, so far as the same can carry the sphere series between the first and second rollers.

Preferably, the aforementioned feeder is formed by an oscillatory type feeder which carries the sphere series along its longitudinal direction by being vibrated, as described in claim 3. In this case, a carriage groove which extends in the sphere series carrier direction and has a width larger than the diameter of the spherical moldings in the sphere series and smaller than twice the diameter is formed in the oscillatory type feeder. The width of the carrier groove must be made larger than the diameter of the spherical moldings since the sphere series is not stored in the carrier groove and hence the sphere series cannot be carried in the carrier groove direction if the width of the carrier groove is smaller than the diameter of the spherical moldings. On the other hand, the width of the carrier groove must be made smaller than twice the diameter of the spherical moldings since the sphere series may be moved in the groove while being entirely or partially arranged in a direction perpendicular to the groove and it is difficult to smoothly perform carriage of the sphere series if the width is in excess of twice.

In the invention described in claim 2, further, preferably a spherical molding container is provided under the first and second rollers, and a screen passing individual spherical moldings but not passing two or more coupled ones is comprised above the spherical molding container, as described in claim 4.

A container having proper material and volume capable of storing individual spherical moldings can be employed as the aforementioned spherical molding container. As the aforementioned screen, further, that consisting of proper material and structure can be employed so far as the same can serve the function of passing individual spherical moldings and not passing coupled ones of two or more spherical moldings. A mesh net consisting of a metal or synthetic resin, a porous plate provided with a number of through holes and the like can be listed as examples of such a screen.

In the spherical series parting method of the invention described in claim 2, the sphere series is automatically supplied between the first and second rollers by the feeder. Between the first and second rollers, the outer peripheral surface of the first roller and the outer peripheral surface of the second roller having different speeds come into contact with the sphere series since the rotation speeds of the first and second rollers are different from each other. In this case, the travelling speed of the outer peripheral surface of the first roller is different from the travelling speed of the outer peripheral surface of the second roller, whereby shearing stress resulting from the travelling speed difference between the same is applied to the sphere series, so that individual spherical moldings are thereby parted from the sphere series.

When the aforementioned oscillatory type feeder provided with the carrier groove is employed, the sphere series can be reliably carried between the first and second rollers along the direction in which the individual spherical moldings are linked with each other. Therefore, the sphere series is reliably supplied between the first and second rollers in the direction being its coupling direction. Thus, individual spherical moldings can be reliably parted from the sphere series.

In the structure providing the spherical molding container and the screen under the first and second rollers, further, only the individual spherical moldings are reliably stored in the spherical molding container by the screen.

The inventions described in claims 12 to 14 of the present invention are related to sphere series parting apparatuses for carrying out the sphere series parting steps of the aforementioned inventions described in claims 2 to 4, and comprise the following structures respectively. Namely, the invention described in claim 12 is provided by a sphere series parting apparatus which is a sphere series parting apparatus employed for the method of preparing spherical moldings described in claim 2 and characterized by comprising first and second rollers having different rotation speeds, and a feeder for supplying the sphere series between the said first and second rollers.

In the invention described in claim 13, provided is a sphere series parting apparatus in which the said feeder is an oscillatory type feeder carrying the sphere series by being vibrated, and a carrier groove extending in the direction for carrying the sphere series and having a width larger than the diameter of the spherical moldings in the sphere series and smaller than twice the diameter is formed in the said feeder.

In the invention described in claim 14, further, provided is a sphere series parting apparatus further comprising a spherical molding container provided under the said first and second rollers, and a screen arranged above the said spherical molding container for passing individual spherical moldings while not passing those coupling two or more spherical moldings.

In the method of preparing spherical moldings according to the present invention, a sphere series in which spherical moldings are linked with each other is obtained by injection molding as described above, and the sphere series is parted by the sphere series parting step of the invention described in claim 2 so that individual spherical moldings are obtained, while a step of providing fine texture patterns to the individual spherical moldings obtained by parting the sphere series is preferably further comprised, as in the invention described in claim 5. Here, the step of providing the fine texture patterns is carried out by supplying the said spherical moldings and a powdery abrasive having larger hardness than the spherical moldings into a working space between a container having a substantially conical inner surface shape and a substantially conical rotor which is inserted in the container, grinding the same while rotating at least either one of the aforementioned rotor and the container, and forming fine texture patterns on the surfaces of the aforementioned spherical moldings.

Therefore, the invention described in claim 5 requires absolutely no liquid such as a working fluid or a polishing liquid, since the spherical moldings are ground by the aforementioned specific powdery abrasive in the aforementioned step of providing texture patterns. Thus, only grinding chips adhering to the roller of the apparatus and the inner wall of the container may be removed, whereby the number of times of a dressing treatment can be remarkably reduced.

Also in the invention described in claim 6, a step of forming fine texture patterns on the surfaces of the said spherical moldings obtained by parting the sphere series is further comprised. Here, the said step of forming the fine texture patterns is carried out by filling the spherical moldings and powder having larger hardness than the spherical moldings with a maximum grain size measured along JIS R6010 of not more than 110 μm in a pot of a ball mill apparatus and rotating the said pot thereby forming fine texture patterns on the surfaces of the spherical moldings.

In the surface working method of the invention described in claim 6, a general ball mill is employed as an apparatus for forming fine texture patterns on the surfaces of the spherical moldings.

Spherical bodies obtained by molding those made of cellulose acetate, polystyrene, polyamide (nylon), polytetrafluoroethylene, a perfluoroethylene propylene copolymer, polyethylene terephthalate, polyethylene, polyvinyl chloride, acrylic resin, ethyl cellulose and the like are listed as the aforementioned spherical moldings.

Powder having larger hardness than the spherical moldings which are workpieces is selected as the aforementioned abrasive, and powdery white alumina or the like is preferably employed, for example. The grain size of the abrasive is properly decided according to the diameter and material of the ground spherical bodies, the shape and depth of the texture patterns formed on the spherical bodies and the like, while the same is limited to not more than 110 μm in maximum grain size (maximum grain size of fine grains measured in accordance with JIS R6010).

The aforementioned spherical moldings and the abrasive are filled in a pot of a ball mill apparatus, and the pot is rotated thereby forming fine texture patterns on the surfaces of the spherical moldings.

The spherical moldings are buried in the abrasive by employing the abrasive of the aforementioned powder, whereby an impact and a load in grinding are not applied to the spherical bodies but absorbed by the abrasive.

The shape and depth of the texture patterns formed on the spherical moldings can be adjusted by properly selecting the aforementioned abrasive and the grain size.

The time required for the aforementioned grinding is properly decided in accordance with the surface hardness of the spherical moldings, the shape and depth of the texture patterns and the like.

In the invention described in claim 7, a step of separating the spherical moldings and the abrasive from each other after obtaining the spherical moldings provided with the fine texture patterns on the surfaces as described above is further comprised. Such a step of separating the spherical moldings and the abrasive from each other is carried out by supplying the spherical moldings having the abrasive adhering to the surfaces to a hopper provided with a screen part for separating the said spherical moldings and the abrasive from each other and rocking the said hopper with the screen part as described in claim 7, and the said screen part comprises meshes which are smaller than the diameter of the spherical moldings and larger than the diameter of the abrasive grains, while the space of a path reaching the mesh surface of the screen part from an introduction part of the said hopper is rendered 1.1 to 1.8 times the diameter of the spherical moldings. Here, the screen comprises the meshes which are smaller than the diameter of the spherical moldings and larger than the diameter of the abrasive grains and the space of the path reaching the mesh surface of the screen part from a hopper end portion is rendered 1.1 to 1.8 times the diameter of the spherical moldings, whereby there is provided such a chance that the overall surfaces of the spherical moldings come into contact with the mesh surface by rocking of the mesh surface, as obvious from the description of embodiments described later. Therefore, a screening effect is sufficiently improved, whereby the spherical moldings and other abrasive grains etc. can be efficiently separated from each other through simple equipment in high accuracy.

The invention described in claim 15 is a spherical molding working apparatus for carrying out the aforementioned step of separating the spherical moldings and the abrasive from each other described in claim 7, such a spherical molding working apparatus that both of a hopper for supplying spherical moldings having an abrasive adhering to surfaces thereof and a screen part for separating the said spherical compacts and the abrasive from each other are rocked, and a spherical molding working apparatus employed for a method of preparing spherical moldings characterized in that the said screen part comprises meshes which are smaller than the diameter of the spherical moldings and larger than the diameter of the abrasive and the space of a path reaching the mesh surface of the screen part from the said hopper end portion is 1.1 to 1.8 times the diameter of the spherical moldings.

In the invention described in claim 8, specific surface roughness is provided to a form block for injection molding, in order to obtain the sphere series in which spherical moldings are linked with each other in the invention described in claim 1. Therefore, spherical moldings provided with the specific surface roughness are obtained by injection-molding resin through the form block provided with the surface roughness.

In the invention described in claim 8, the specific surface roughness is first provided to the form block. The form block may be either a metal mold or a resin mold. The method of providing roughness to the surface of the form block is not particularly restricted, but can be performed by a sandblasting treatment, etching, buff polishing or the like, for example.

The degree of the aforementioned specific surface roughness which is provided to the form block is in response to the aforementioned specific surface roughness which is provided to the spherical moldings, and properly set in response to the use of the spherical moldings. When the spherical moldings are employed for carriers for adsorbing granular spheres described in Japanese Patent laying-Open No. 5-168706, for example, the aforementioned surface roughness is so selected that the center-line mean roughness Ra value is in the range of 0.01 to 30 μm, preferably about 0.01 to 10 μm, as described in claim 9. The center-line mean roughness Ra value indicates the center-line mean roughness in JIS B0601-1982.

The material forming the spherical moldings provided with the aforementioned surface roughness in the invention described in claim 8 is not particularly restricted but arbitrary thermoplastic resin which can be injection-molded can be employed, and the type of such thermoplastic resin is properly selected in response to the use.

In the method of preparing spherical moldings of the invention described in claim 8, spherical moldings are obtained by providing specific surface roughness to a form block and performing injection molding through the form block provided with the surface roughness. Therefore, surface roughness which is responsive to the aforementioned surface roughness of the form block is provided to the spherical molding surfaces. In this case, the roughness provided to the spherical molding surfaces do not necessarily coincide with the surface roughness of the form block depending on the treatment for providing the surface roughness and the molding conditions as described above, while surface roughness is provided to the spherical molding surfaces in response to the surface roughness of the form block in any way. Therefore, spherical moldings having target specific surface roughness can be reliably obtained by controlling the surface roughness of the form block.

A concrete embodiment of a method of preparing spherical moldings of the invention described in claim 10 is now described with reference to the case of spherical moldings which are employed as body fluid component adsorbing carriers. For example, reference is made on the case of obtaining carriers which are cellulose acetate spheres of 2 mm in diameter having surface roughness of about 0.01 to 30 μm in Ra value. First, a sandblast treatment is performed on a form block for injection molding in the range of #150 to #400. In the sandblast treatment, a combined surface of the form block is masked, thereby preventing the combined surface from provision of surface roughness. Thereafter the aforementioned sandblast treatment is performed, and then the mask is removed to perform injection molding. Consequently, roughness of the form block surface is transferred to the surfaces of the obtained spherical cellulose acetate carriers, so that carriers consisting of cellulose acetate spheres provided with the aforementioned surface roughness can be obtained.

The aforementioned surface roughness Ra value is varied with the blast time and the blast pressure, even in case of performing the same sandblast treatment. Further, the transfer state of the surface roughness is remarkably influenced by molding conditions such as the injection pressure and the pressure holding time, even in case of employing a form block provided with the same roughness. Therefore, it is necessary to select the aforementioned respective conditions so that target surface roughness is finally formed on the carrier surfaces.

Further, the surface roughness Ra value on the carrier surfaces is varied with the measuring method, while the aforementioned Ra value in this specification was measured with a three-dimensional focus-moving non-contact scanning laser microscope: 1LM11 by Lasertec.

The invention described in claim 10 is the method of preparing spherical moldings related to the invention described in any of the aforementioned claims 1 to 9 in which the aforementioned spherical moldings are carriers for adsorption of body fluid components or for diagnostic reagents, while carriers for a diagnostic reagent which are spherical moldings obtained by any of the methods according to the inventions described in the aforementioned claims 1 to 10 are provided in the invention described in claim 11.

BEST MODES FOR CARRYING OUT THE INVENTION

Non-restrictive embodiments of the present invention are now described, thereby clarifying the present invention.

Figure 1:
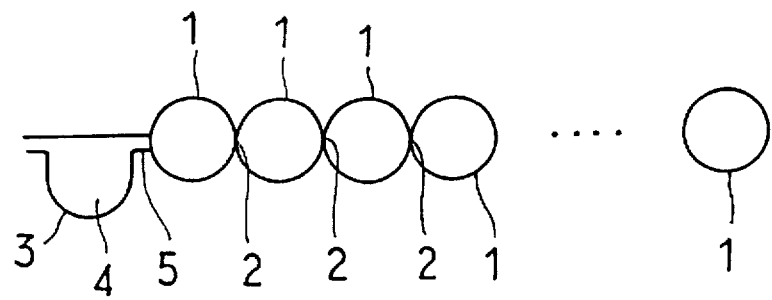
FIG. 1 is a typical side elevational view for illustrating a sphere series which is a coupled body of spherical moldings obtained in Example of the invention described in claim 1.
Figure 2:
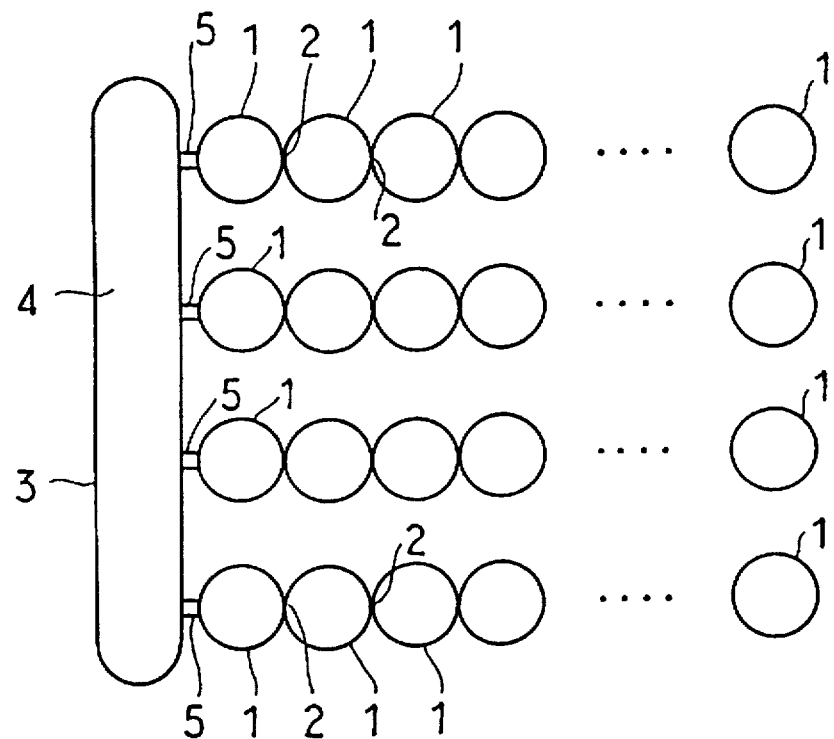
FIG. 2 is a typical plan view for illustrating the sphere series shown in FIG. 1.

FIG. 1 is a typical side elevational view for illustrating moldings which are formed in accordance with the method of preparing spherical moldings described in claim 1, and FIG. 2 is a plan view. Referring to FIGS. 1 and 2, a number of spherical moldings 1 are formed in a state being coupled with each other through bridge parts 2. FIGS. 1 and 2 show such a state that the aforementioned moldings 1 are formed in a molding apparatus, and the moldings 1 illustrated in a state being connected with resin 4 which is arranged in a runner 3. Numeral 5 denotes gates.

Figure 3A:
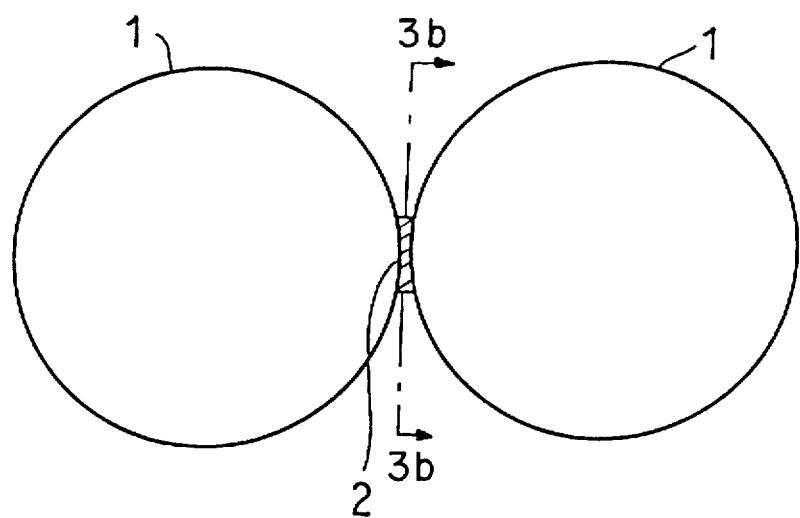
FIGS. 3(a) and 3(b) are a side elevational view of spherical moldings which are coupled with each other through a bridge and a sectional view taken along the line B—B in (a).
Figure 3B:
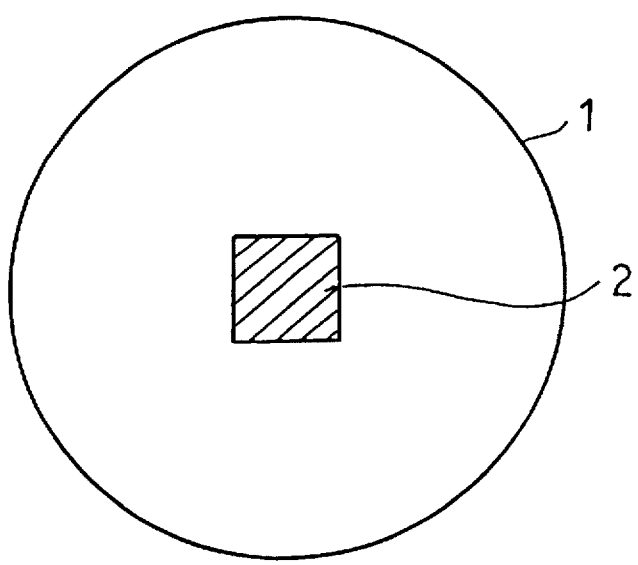

In the example shown in FIGS. 1 and 2, the gates 5 are coupled to the runner 3 plurally, and a plurality of molding forming parts are coupled to each gate 5 through bridges so that a plurality of moldings 1 are obtained. Therefore, a plurality of moldings 1 which are coupled with each other through the bridge part as shown in FIGS. 3(a) and (b) are simultaneously molded.

EXAMPLE 1

Spherical moldings of 2.5 mm in diameter consisting of polystyrene were formed. The number of coupling of forming parts with respect to one gate was set at 30, the number of bridges was set at 29, and the sectional area and the length of each bridge were set at 0.36 mm$^2$ and about 0 mm respectively. As to runners, a pair of runners were connected to both sides of the forming parts which were coupled with each other through the aforementioned bridges, and cold runners were employed as the runners. Further, 340 gates for both side runners, i.e., 170 gates were connected to each runner. The aforementioned method and specification are shown in Table 1 together.

Consequently, it was possible to obtain 5100 spherical moldings consisting of polystyrene at once.

EXAMPLES 2 to 5

Similarly to Example 1, moldings of shapes and materials shown in the following Table 1 were injection-molded in a multiple manner in accordance with the present invention. The following Table 1 shows the numbers of coupling of the moldings by bridges, the sectional areas of the bridges, the lengths of the bridges, the number of gates connected to runners, arrangement of the runners, and the runner systems.

As obvious from Table 1, it is possible to obtain 4300, 200, 9000 and 200 moldings at once in Examples 2 to 5 respectively.

COMPARATIVE EXAMPLE 1

Similarly to Example 1, spherical moldings of 2.0 mm in diameter consisting of polystyrene were formed. Multiple injection molding was performed while providing no bridges on a molding apparatus but similarly to Example 1 as to other points. In this case, 170 gates were merely connected to each side of runners arranged on both sides, and hence only 170 moldings could be obtained at once.

TABLE 1

|  | Example 1 | Example 2 | Example 3 | Example 4 | Example 5 | Comparative Example 1 |
| --- | --- | --- | --- | --- | --- | --- |
| Molding Shape | Φ 2.0 mm spherical | Φ 2.3 mm spherical | Φ 6.0–4.0 mm elliptic sphere | Φ 2.2 mm height 2 mm cylindrical body | length of one side 10 mm cube | Φ 2.0 mm spherical |
| Material | polystyrene | cellulose acetate | polypropylene | polyethylene | polycarbonate | polystyrene |
| Coupling Number | 30 | 20 | 10 | 50 | 5 | 1 |
| Bridge Number | 29 | 19 | 9 | 49 | 4 | 0 |
| Bridge Sectional Area (mm$^2$) | 0.36 | 0.25 | 1 | 0.09 | 0.16 | |

TABLE 1-continued

|  | Example 1 | Example 2 | Example 3 | Example 4 | Example 5 | Comparative Example 1 |
| --- | --- | --- | --- | --- | --- | --- |
| Bridge Length (mm) | 0 | 0 | 3 | 1 | 2 |  |
| Gate Number | 340 | 215 | 40 | 360 | 40 | 340 |
| Runner Arrangement | both sides | one side | both sides | both sides | one side | both sides |
| Taking Number (Number) | 5100 | 4300 | 200 | 9000 | 200 | 170 |
| Runner System | cold runner | mini hot runner | hot runner | mini hot runner | cold runner | cold runner |

Φ indicates a diameter

Figure 4:
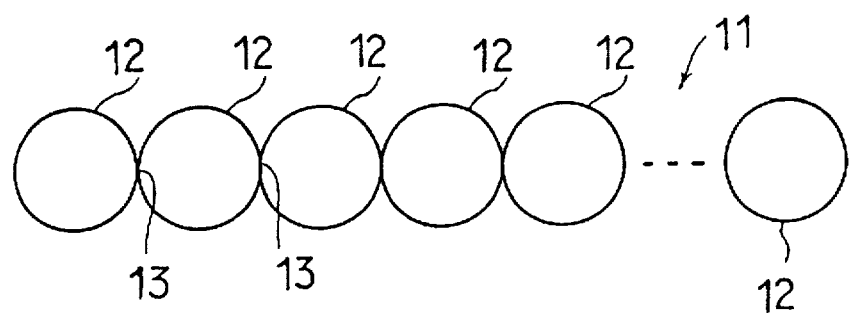
FIG. 4 is a front elevational view for illustrating a sphere series.

FIG. 4 is a front elevational view for illustrating a sphere series. The sphere series 11 has such a structure that a plurality of spherical moldings 12 are coupled with each other. This spherical series 11 is obtained by injection-molding synthetic resin, and a number of spherical moldings 12 can be molded in better efficiency by increasing the number of the spherical moldings 12.

The spherical moldings 12 are coupled with each other by bridges 13. The sectional area of the bridges 13 is set at about 0.01 mm$^2$ to 5 mm$^2$ in general when the diameter of the spherical moldings is about 2.5 mm, while the length of the bridges is set at about 0 to 2 mm. Namely, the width and length of the bridges 13 are considerably reduced as compared with the diameter of the spherical moldings 12.

As hereinabove described, a method of cutting moldings with scissors or a cutter, and a method of separating the moldings by pressing the sphere series against the inner wall of a mortar with a pestle in the mortar have been employed in general, in order to part individual spherical moldings from the sphere series.

The following embodiment is related to an apparatus for automatically parting individual spherical moldings 12 from the sphere series 11 shown in FIG. 4. A parting apparatus according to an embodiment of the present invention is described with reference to FIGS. 4 and 5.

Figure 5:
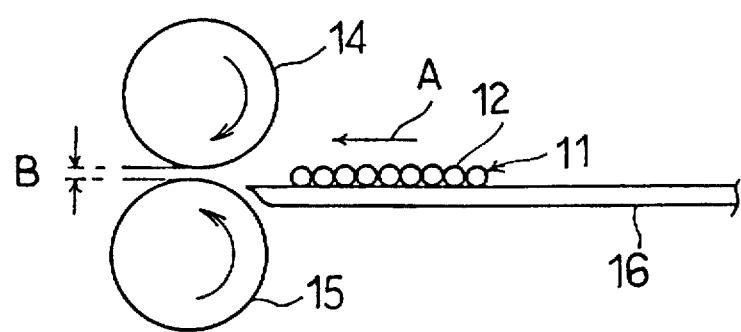
FIG. 5 is a schematic block diagram for illustrating a principal part of Example of a sphere series parting apparatus.

FIG. 5 is a schematic block diagram for illustrating a principal part of the parting apparatus according to the embodiment of the present invention. Referring to FIG. 5, rollers 14 and 15 are arranged in the parting apparatus of this embodiment. The rollers 14 and 15 are rotated in opposite directions to each other by a rotation driving source which is not shown, such as a motor, for example. The rotation speeds of the first roller 14 and the second roller 15 are made to differ from each other.

On the other hand, a feeder 16 is provided for supplying the sphere series 11 between the first and second rollers 14 and 15. The feeder 16 is formed to be capable of supplying the sphere series 11 in a direction of arrow A shown in the figure, i.e., between the rollers 14 and 15. The feeder 16 can be formed by an oscillatory type feeder which can carry the sphere series 11 in the direction of arrow A shown in the figure, or another proper feeder. Preferably, the feeder 16 is formed by the aforementioned oscillatory type feeder.

While a space B between the rollers 14 and 15 must be brought into a magnitude which can pass the spherical moldings 12 therethrough, the spherical moldings 12 cannot be parted from the sphere series 11 if the same is too large as compared with the diameter of the spherical moldings 12. Therefore, the space B between the rollers 14 and 15 is set at a magnitude which is equivalent to the diameter of the spherical moldings 12 to a magnitude of about ½ times the diameter, in general.

In the parting apparatus of this embodiment, the sphere series 11 is supplied between the rollers 14 and 15 by the feeder 13. In this case, travelling speeds of the outer peripheral surfaces of the rollers 14 and 15 are different from each other, whereby shearing stress is applied to the sphere series 11 between the rollers 14 and 15 by the travelling speed difference therebetween, individual spherical moldings are parted from the sphere series 11, and the individual spherical moldings are parted from the sphere series 11 and discharged from between the rollers 14 and 15. Therefore, the operation of parting the individual spherical moldings 12 from the sphere series 11 can be automated by a machine. Thus, a large quantity of sphere series 11 can be automatically and efficiently parted into the individual spherical moldings 12.

A parting apparatus according to a more concrete embodiment of the present invention is now described with reference to FIG. 6.

Figure 6:
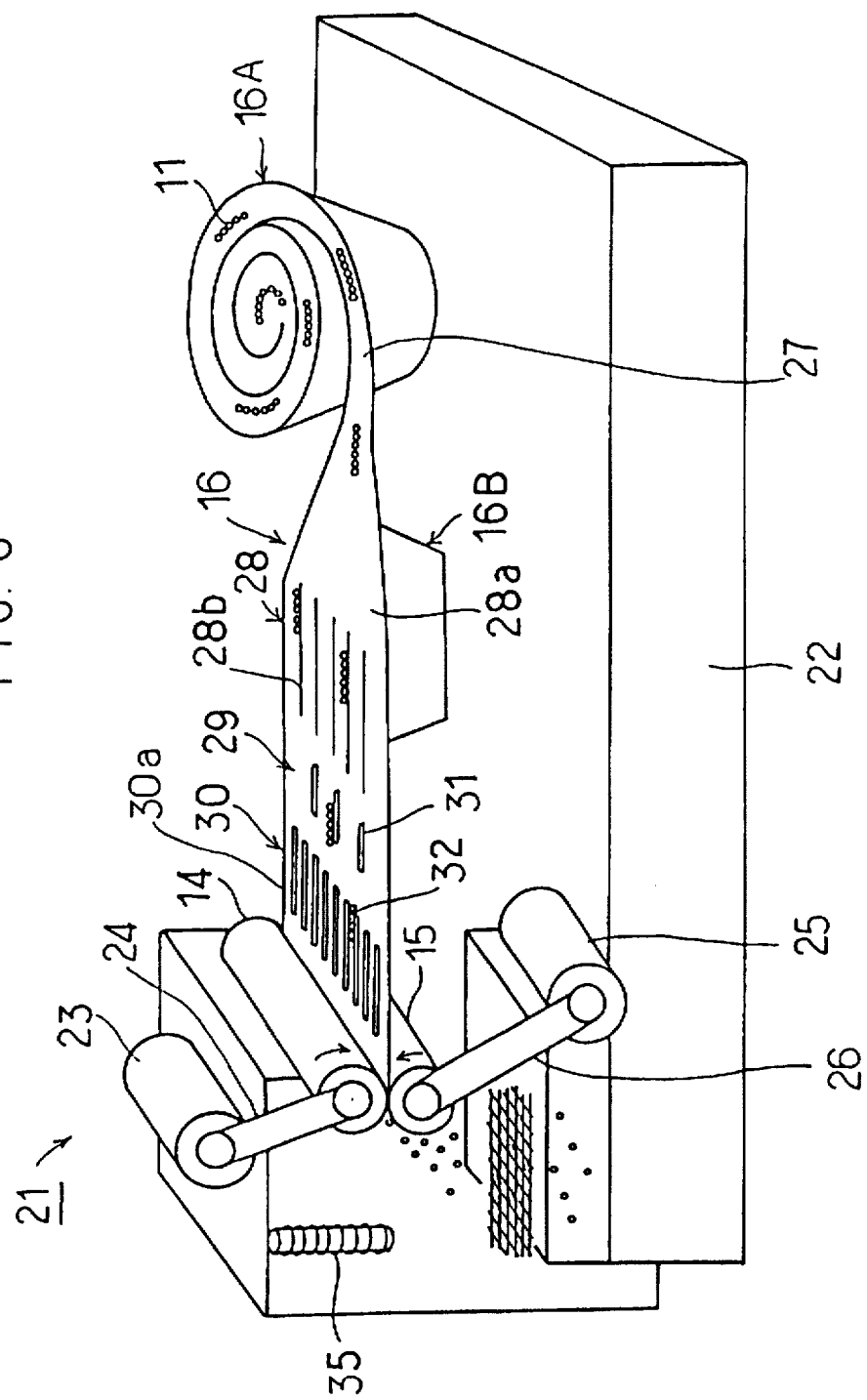
FIG. 6 is a perspective view for illustrating a concrete embodiment of the sphere series parting apparatus shown in FIG. 5.

The parting apparatus 21 of the embodiment shown in FIG. 6 corresponds to a structure embodying the parting apparatus shown in FIG. 5. Namely, rollers 14 and 15 are arranged above an upper part of a base plate 22. The first roller 14 is coupled to a motor 23 by a belt 24, so that the same can thereby be rotated/driven in the direction of arrow shown in the figure. Similarly, the second roller 15 is coupled to a motor 25 which is arranged on a lower part by a belt 26, and can be rotated/driven in the direction of arrow shown in the figure by driving the motor 25.

On the other hand, a feeder 16 is arranged on a side portion of the rollers 14 and 15. According to this embodiment, the feeder 16 has a circular parts feeder 16A, and a linear parts feeder 16B. The circular parts feeder 16A is so structured that sphere series 11 which are taken out from an injection molding machine are introduced from its central upper part, and the sphere series 11 are spirally carried by vibration, and discharged from a discharge part 27 of the parts feeder 16A. The discharge part 27 is so structured that its width is larger than the diameter of each spherical molding 12 and not more than twice the diameter, to be capable of carrying the sphere series 11 along the direction coupling the individual spherical moldings 12 with each other.

The linear parts feeder 16B is provided for making it possible to supply the sphere series 11 which are discharged from the circular parts feeder 16A between the first and second rollers 14 and 15 in an aligned state. Namely, the linear parts feeder 16B is structured to be capable of supplying the sphere series 11 in the direction along the direction coupling the spherical moldings 12 with each other between the first and second rollers 14 and 15.

The linear parts feeder 16B has first to third feeder parts 28 to 30. The first feeder part 28 has such a structure that wires 28b such as piano wires are arranged on a plate 28a plurally along the carrier direction. Namely, it is structured by arranging a plurality of wires 28b to extend in parallel with each other along the carrier direction, so that the sphere series 11 can be moved along the longitudinal direction thereof in a carrier region between the overlapping wires.

Also in the second feeder part 29, a plurality of partition walls 31 are formed in parallel with each other to extend along the carrier direction for the sphere series 11. The partition walls 31 consist of a proper material such as a metal or synthetic resin, and are formed to be longer than the height of the sphere series 11.

Figure 7:
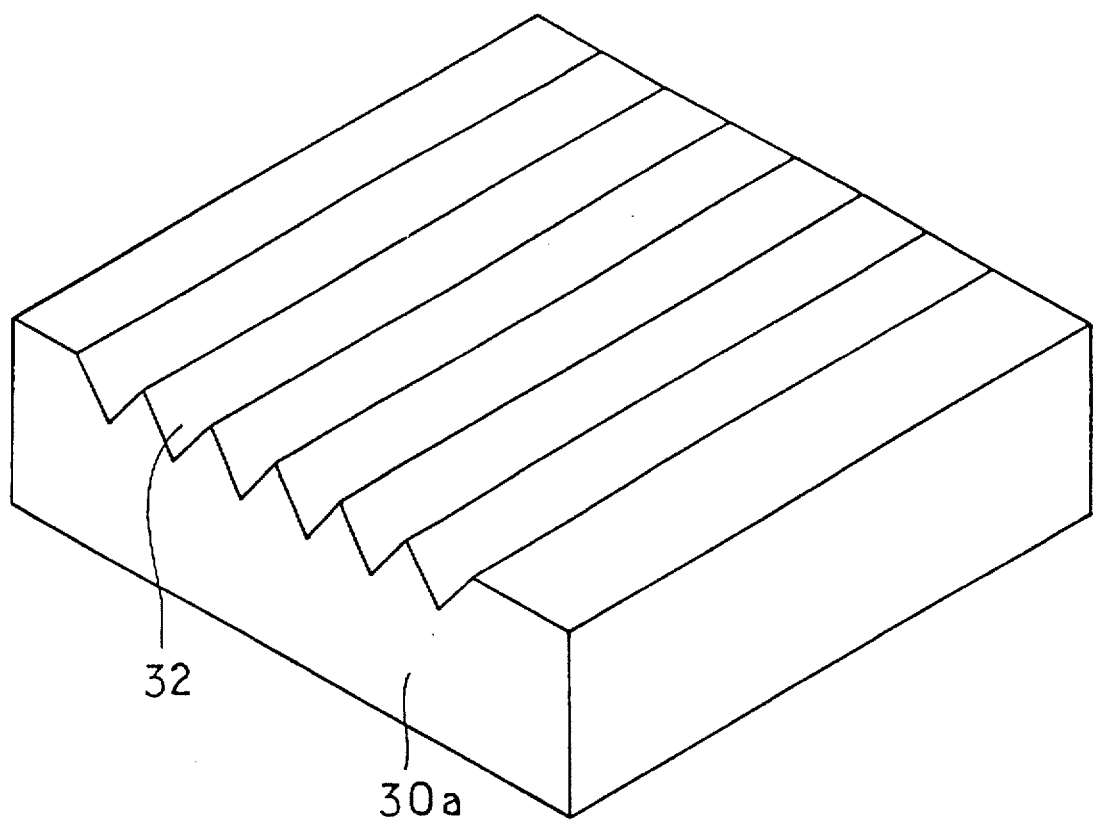
FIG. 7 is a perspective view for illustrating carrier grooves.

In the third feeder part 30, further, a plurality of carrier grooves 32 shown in FIG. 7 are formed on a plate 30a. These carrier grooves 32 are formed to extend in the carrier direction for the sphere series 11. The width of the carrier grooves 32 is made larger than the diameter of the spherical moldings 12 and narrower than twice the diameter. Further, the direction of extension of the carrier grooves 32 is rendered perpendicular to the longitudinal direction of the first and second rollers 14 and 15. Therefore, the sphere series 11 which are carried in the carrier grooves 32 are reliably supplied between the first and second rollers 14 and 15 successively from the head spherical body.

Figure 9:
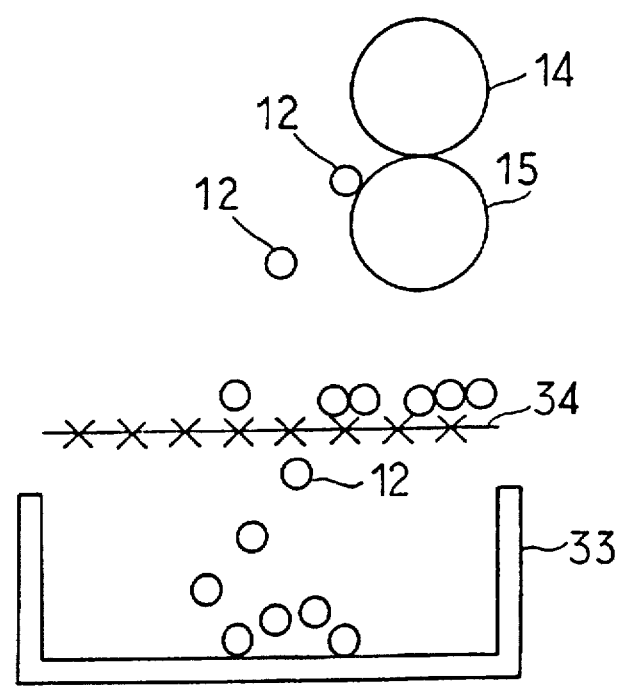
FIG. 9 is a sectional view for illustrating a spherical molding container and a screen part.

A spherical body container 33 shown in FIG. 9 is arranged under discharge sides of the first and second rollers 14 and 15, and this container 33 is made of a proper material which can contain the parted spherical bodies.

Further, a screen 34 is arranged above the spherical body container 33. This screen 34 is formed by a mesh net consisting of a metal mesh net which can pass parted individual spherical bodies 3 while not passing those in which two or more spherical bodies are coupled with each other in this embodiment.

Referring to FIG. 6, numeral 35 denotes a height adjusting mechanism which is provided for adjusting the height of the roller 14. The space between the first and second rollers 14 and 15 can be adjusted to a space suitable for parting the spherical moldings 12 from the sphere series 11, by adjusting the height of the roller 14 by this height adjusting mechanism 35.

When the parting apparatus 21 shown in FIG. 6 is employed, the sphere series 11 can be reliably supplied between the first and second rollers 14 and 15 by introducing the sphere series 11 which are taken out from the injection molding machine into the center of the circular parts feeder 16A and thereafter vibrating the parts feeder 16. Further, the individual spherical moldings 12 are reliably parted from the sphere series 11 between the first and second rollers 14 and 15 and collected in the spherical body container 33 which is arranged on the lower part, since the rotation speeds of the rollers 14 and 15 are different from each other. When two or more spherical bodies erroneously downwardly fall while being coupled with each other, the same are prevented from falling in the spherical body container 33 by the aforementioned screen 34. Thus, only the individual spherical moldings 12 are reliably contained in the spherical body container 33.

Concrete Experimental Examples are now described.

Sphere series 11 each formed by 20 spherical moldings of 2.5 mm in diameter consisting of synthetic resin which were coupled with each other were parted through the parting apparatus 21. In the parting, parting of the sphere series 11 was performed under conditions of the following Example 6 and Example 7.

EXAMPLE 6

Rollers of 90 mm in diameter were employed as the first and second rollers 14 and 15, and the rotation speed of the first roller 14 was set at 10 rpm, while the rotation speed of the second roller 15 was set at 8 rpm. In the first feeder part 28, piano wires of 1 mm in diameter×30 cm in length were arranged at spaces of 2.5 cm. In the second feeder part 29, further, partition walls of 8 cm in length and 4.0 mm in width consisting of acrylic plates were arranged in parallel with each other at spaces of 35 mm, as partition walls 19a. In addition, a part provided with carrier grooves 32 of 5 mm in depth and 10 mm in width having V-shaped sections was employed as the third feeder part 30.

EXAMPLE 7

Rollers of 90 mm in diameter were employed as the first and second rollers 14 and 15, and the rotation speed of the first roller 14 was set at 10 rpm, while the rotation speed of the second roller 15 was set at 3 rpm. The first feeder part and the second feeder part of the linear parts feeder 16B were structured similarly to Example 6. As to the third feeder part, however, a part provided with grooves of 5 mm in depth and 10 mm in width having U-shaped sections was employed.

For the purpose of comparison, parting of sphere series 11 was similarly performed under the following two types of conditions.

COMPARATIVE EXAMPLE 2

Figure 8:
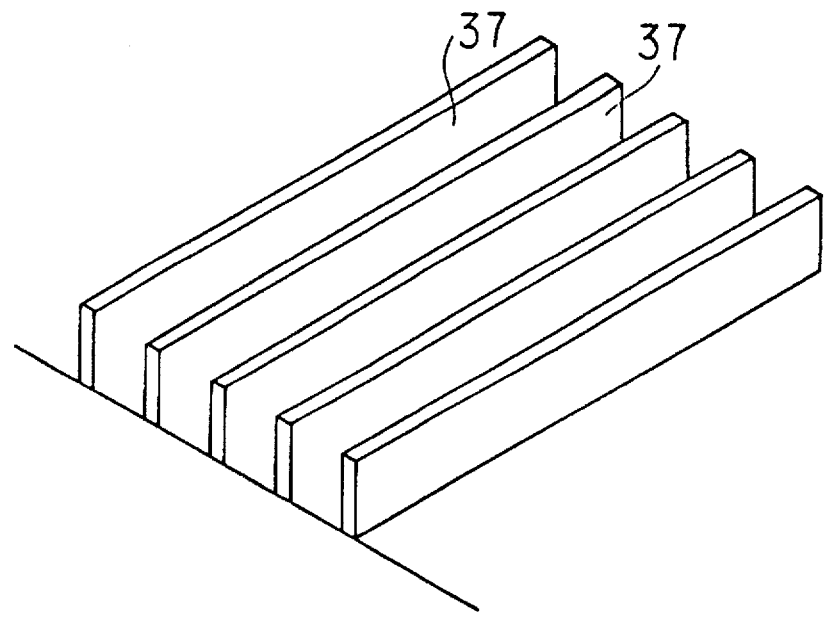
FIG. 8 is a perspective view for illustrating a third feeder part employed in comparative example.

Rollers of 90 mm in diameter were employed as the first and second rollers 14 and 15, while the rotation speeds of these were set at 10 rpm, identically. Further, a part uprightly provided with a plurality of partition walls 37 in parallel with each other as shown in FIG. 8 in place of the carrier grooves was employed as the third feeder part of the linear parts feeder. The spaces between the partition walls 37, 37 were set at 3 mm, while the length and the height of the partition walls 37 were set at 5 mm and 4 mm respectively.

COMPARATIVE EXAMPLE 3

Rollers of 90 mm in diameter were employed as the first and second rollers 14 and 15, and the rotation speeds were set at 10 rpm for both ones. As to the third feeder part of the linear parts feeder, that uprightly provided with a plurality of partition walls 37 similarly to comparative example 1 was employed. However, the spaces between the partition walls 37 were set at 5 mm.

Parting of sphere series 11 was performed under the conditions of the aforementioned Examples 6 and 7 and comparative examples 2 and 3, whereby it was possible to reliably separate individual spherical moldings from the sphere series 11 in Examples 6 and 7. In comparative examples 2 and 3, on the other hand, the rates of remaining of two or more spherical moldings with no parting were high since the rotation speeds of the first and second rollers 14 and 15 were identical to each other. In addition, the sphere series 11 were hardly reliably supplied between the first and second rollers 14 and 15 along the direction of coupling thereof between the rollers 14 and 15.

A step of working spherical moldings which are parted from sphere series in the aforementioned manner is now described. Namely, an embodiment described next corresponds to an embodiment according to the invention described in claim 5, and is an embodiment further comprising a step of providing fine texture patterns to individual spherical moldings obtained by parting the aforementioned sphere series.

Figure 10:
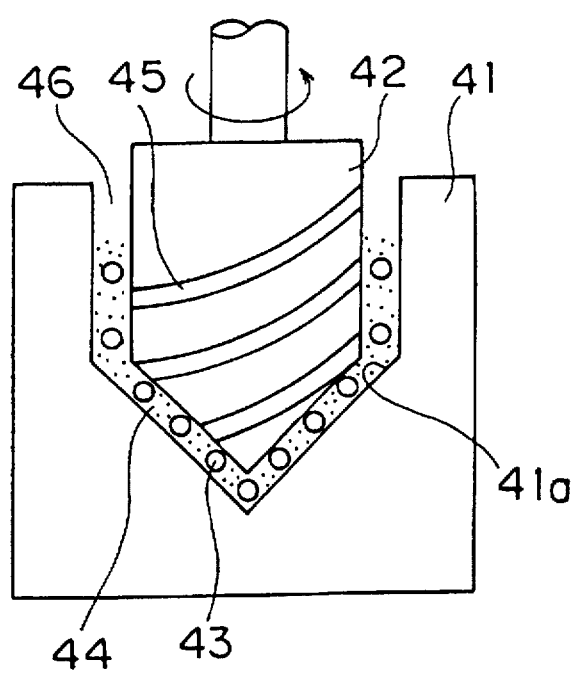
FIG. 10 is a typical sectional view for illustrating an apparatus for providing a texture pattern employed in Example according to the invention described in claim 5.

In the spherical molding working step of this embodiment, an apparatus shown in FIG. 10 in a model diagram is employed, for example. Referring to FIG. 10, numeral 41 denotes a container, and this container 41 has a concave portion 41a of a substantially conical inner shape. Numeral 42 denotes a substantially conical rotor. A working space 46 can be formed between the rotor 42 which is inserted in the container 41 and the inner surface of the container 41, by rendering the outer diameter of this rotor 42 slightly smaller than the inner diameter of the container 41.

Powdery spherical bodies 43 are supplied into the aforementioned working space 46 with an abrasive 44 and the rotor 42 is rotated in the direction of arrow, whereby the surfaces of the spherical bodies 43 are partially ground by the abrasive 44, so that fine texture patterns are formed on the surfaces.

The aforementioned powdery spherical bodies 43 and the abrasive 44 may be previously mixed with each other to be employed.

While the aforementioned rotor 42 is rotated in the aforementioned illustration, the container 41 may be rotated in place of the rotor 42, or both of the rotor 42 and the container 41 may be rotated. When both of the rotor 42 and the container 41 are rotated, it is preferable to rotate the same so that the rotation directions are opposite to each other, or to rotate the same while making the rotation frequencies differ from each other when the rotation directions are identical to each other.

While the aforementioned spherical moldings 43 are obtained by parting the aforementioned sphere series, the material therefor is not particularly restricted. For example, cellulose acetate, polystyrene, polyamide (nylon), polytetrafluoroethylene, a perfluoroethylene-propylene copolymer, polyethylene terephthalate, polyethylene, polyvinyl chloride, acrylic resin and ethyl cellulose can be listed as such materials.

Powder which is larger in hardness than the spherical bodies being workpieces is selected as the aforementioned abrasive 44, and powdery white alumina or the like is preferably employed, for example. The grain size of the abrasive 44 is properly decided by the diameter and hardness of the ground spherical moldings, the shapes and depths of the texture patterns formed on the spherical moldings, and the like.

A spiral groove 45 may be provided on the surface of the aforementioned rotor 42, as shown in FIG. 10. Grinding efficiency can be improved by such a groove 45. Such a groove may be provided on the inner surface (not shown) of the container 41, or may be provided on both of the surface of the rotor 42 and the inner surface of the container 41.

Concrete Example of the spherical body working method described with reference to FIG. 10 is now described as the following Example 8.

EXAMPLE 8

A mixture of 20 g of a powdery white alumina abrasive of #400 and 30 g of cellulose acetate spherical bodies of 2.5 mm in diameter was supplied into a working space formed by a rotor and a container employing an apparatus consisting of the rotor prepared by spirally providing a groove of 5 mm in width and 0.5 mm in depth on the surface of a rotor of 43 mm in diameter and 40 mm in length and the container of 50 mm in inner diameter and 40 mm in depth, and only the rotor was rotated at a rotation frequency of 12 rpm for 1 hour, thereby forming fine texture patterns on the surfaces of the cellulose acetate spherical bodies. The obtained spherical bodies were not broken, and it was possible to form texture patterns of Ra (center-line mean roughness measured in accordance with JIS B0601) value=2.0 µm on the surfaces thereof.

Then, concrete Experimental Example according to the invention described in claim 6 having its characteristic in the step of forming fine texture patterns on the aforementioned spherical moldings obtained by parting sphere series is now described in the following as Example 9.

EXAMPLE 9

500 g of cellulose acetate spherical bodies of 2 mm in diameter and 500 g of white alumina powder of #400 serving as an abrasive were filled in a lidded pot of earthenware of 20 cm in diameter and 25 cm in length through a ball mill apparatus, and thereafter the pot was set so that its central axis was horizontal and rotated at a rotation speed of 10 rpm for 10 hours, thereby forming fine texture patterns on the spherical body surfaces. The obtained spherical bodies were not broken, and it was possible to form texture patterns of Ra (center-line mean roughness measured in accordance with JIS B0601) value=2.0 µm on the surfaces thereof.

While fine texture patterns can be formed on the surfaces of individual spherical moldings which are separated from sphere series by the aforementioned various methods, the spherical moldings and the abrasive are preferably separated from each other after the fine texture patterns are formed in the present invention, in accordance with the invention described in claim 7. A concrete embodiment as to the step of separating the spherical moldings and the abrasive from each other in the invention described in claim 7 is now described with reference to FIG. 11.

Figure 11:
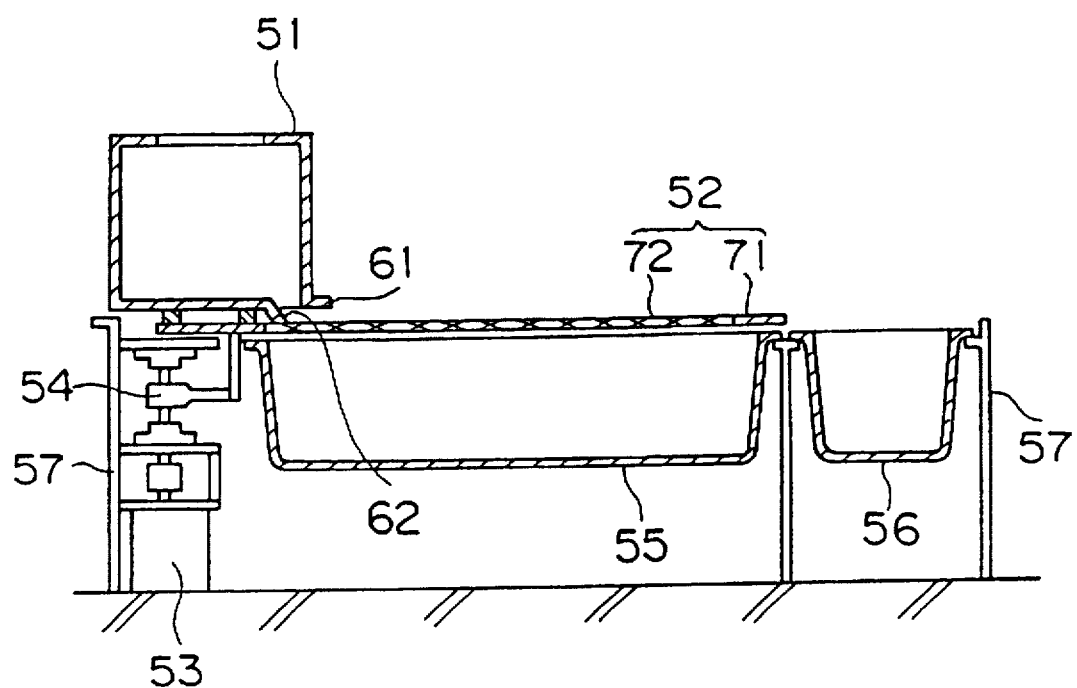
FIG. 11 is a typical sectional view for illustrating an apparatus employed for separating spherical moldings from an abrasive in Example according to the invention described in claim 7.

In a bead working apparatus shown in FIG. 11, a hopper 51 is comprised. A screen part 52 is provided under the hopper 51. The screen part 52 has a frame body 71 and a mesh net 72 which is fixed to an opening portion of the frame body 71. Further, a plate 61 of rubber for roughly supporting a discharge part of the hopper 51 is mounted on a lower portion of the hopper 51. In addition, a rubber plate 62 is mounted to extend over the entire width of the mesh net 72 and to cover an upper portion of the mesh net.

The aforementioned hopper 51 is fixed onto the frame body 71, so that these can be rocked by an eccentric universal 54 which is driven by a motor 53 without changing the positional relation between the aforementioned hopper 51 and the mesh net 72 of the screen part 52. The aforementioned rocking mechanism is not particularly restricted to the above one, but may be mounted to be capable of separately rocking the hopper etc. so far as the same can fix the positional relation between the aforementioned hopper 51 and the mesh net 72 of the screen part 52 at a space of 1.1 to 1.8 times the diameter of treated beads, as defined in the present invention.

Numeral 55 denotes a receiving box for abrasive grains and grinding chips, which has an opening corresponding to the rocking range of the aforementioned mesh net 22. Numeral 56 denotes a receiving box for the screened treated beads. Both of the receiving boxes 55 and 56 are detachably attached to the frame body 57.

The aforementioned screen part 52 is provided with inclination from a portion linked with the aforementioned hopper 51 in the direction of the receiving box 56 for the treated beads, and structured to successively advance by rocking applied from the aforementioned hopper 51 to the mesh net 72, screen the abrasive grains and grinding chips before the treated beads fall in the receiving box 56, and contain these in the receiving box 55.

In the bead working apparatus of this embodiment, the hopper for supplying treated beads having the abrasive grains adhering to the surfaces thereof and the screen part for separating the aforementioned treated beads and the abrasive grains from each other are rocked together, the aforementioned screen part has meshes which are smaller than the diameter of the treated beads and larger than the diameter of the abrasive grains, and the space of a path from the aforementioned hopper end portion to the mesh surface of the screen part is 1.1 to 1.8 times the diameter of the aforementioned treated beads, whereby there is a chance that the overall surfaces of the treated beads come into contact with the mesh surface due to rocking of the mesh surface, so that a screening effect is sufficiently exerted. Thus, the treated beads and other abrasive grains etc. can be efficiently separated from each other through simple equipment.

Concrete Experimental Example of the step of separating beads to be treated and abrasive grains from each other employing the bead working apparatus shown in FIG. 11 is now described with reference to FIG. 11.

In the bead working apparatus shown in FIG. 11, the hopper 51 was formed by stainless to have dimensions of 400 mm in width, 150 mm in depth and 150 mm in height. Further, rubber plate 61 and 62 consisting of silicone rubber are comprised, and these rubber plates 61 and 62 seal clearances between the same and the mesh net 72 surface respectively, to control the fall quantity so that the treated beads falling on the mesh net 72 surface are not deposited in a multilayer manner.

The aforementioned screen part 52 is so structured that the forward end of the mesh net 72 surface of 300 mm in length and 300 mm in width having mesh openings of 1.5 mm is positioned at 4.5 mm immediately under a dropping hole of the hopper 51 on the frame body 71 of 800 mm in travelling a direction (longitudinal direction) for treated beads and 400 mm in width, and provided with inclination of 10 degrees toward an end portion.

The aforementioned hopper 51 and the screen part 52 were set to be rocked by an eccentrical universal 54 which is driven by an electric motor 53 at 70 times/min. at a rocking stroke of 30 mm.

EXAMPLE 10

Performed through the bead working apparatus shown in FIG. 11 structured as hereinabove described. First, 9 kg of beads of 25 mm in diameter consisting of cellulose acetate which were ground with 2 kg of a #400 white alumina abrasive defined in JIS R6111 (not more than 75 μm in maximum grain size, at least 25 μm in grain size at a cumulative height 94% point) for 6 hours in a ball mill were screened into treated cellulose acetate beads, an abrasive and grinding chips through the aforementioned bead working apparatus at a treatment verocity of 10 kg/h.

The aforementioned screened treated cellulose acetate beads were washed with methanol so that additives of the aforementioned resin leached on the surfaces of the treated cellulose acetate beads were removed, and dried. Then, the methanol-washed treated cellulose acetate beads were washed with water once in the usual way, and dried to complete surface working of the cellulose acetate beads.

The evaporation residue of the obtained wash filtrate of the surface-worked cellulose acetate beads was zero.

COMPARATIVE EXAMPLE 4

Treated cellulose acetate beads, an abrasive and grinding chips were screened similarly to Example 10, except that the space from the dropping hole of the hopper 51 of the bead working apparatus employed in Example 10 to the mesh net 72 surface immediately under the same was set at 50 mm.

The aforementioned screened treated cellulose acetate beads were methanol-washed similarly to Example 10 and thereafter washed in the usual way so that washing was repeated five times, while an evaporation residue of the wash filtrate remained and the evaporation residue finally disappeared at the sixth time.

Then, an embodiment according to the invention described in claim 8 is described with reference to the following Examples 11 and 12 serving as concrete Experimental Examples and comparative example 5.

EXAMPLE 11

Spherical carriers of 2.3 mm in diameter were prepared from cellulose acetate by injection molding. In advance of the molding, a sandblast treatment of #600 was performed on a mold surface except a coupled surface. In this case, surface roughness of Ra value=3.5 μm was applied to the surface of the mold.

The mold provided with the surface roughness in the aforementioned manner was employed to injection-mold the cellulose acetate under conditions of an injection pressure of 1700 kg/cm$^2$ and a pressure holding time of 2.0 seconds, to obtain carriers. When the roughness of the surfaces of the obtained carriers was measured, the Ra value was 3.10 μm.

EXAMPLE 12

Spherical carriers consisting of cellulose acetate were prepared similarly to Example 11, except that a sandblast treatment of #320 was performed in place of the sandblast treatment of #600 as a treatment of providing surface roughness to a mold surface.

In Example 12, the surface roughness of the mold by the sandblast treatment of #320 was Ra value=7.0 μm. On the other hand, the surface roughness of the obtained carrier surfaces was Ra value=6.40 μm.

COMPARATIVE EXAMPLE 5

Spherical carriers consisting of cellulose acetate were prepared similarly to Example 11, except that a mold surface was not sandblast-treated. The center-line mean roughness Ra of the obtained carrier surfaces was 0.01 μm.

As described above, it is understood that surface roughness of the obtained carrier surfaces can be readily controlled in Examples 11 and 12 by changing the conditions of the sandblast treatment. In any method of Examples 11 and 12 and comparative example 5, no occurrence of grinding chips and fine grains was caused since the carriers were merely prepared by injection molding.

EFFECTS OF THE INVENTION

As hereinabove described, a bridge of 0.01 to 10 mm$^2$ in sectional area for feeding resin is arranged between forming parts and a plurality of forming parts are coupled to two gates through the aforementioned bridge for performing injection molding according to the method related to the invention described in claim 1, whereby a number of spherical moldings can be formed at once without increasing the runner in size. Therefore, multiple injection molding can be performed without causing increase of runner loss.

As compared with the conventional method of connecting one forming part to one gate, it is possible to form a larger number of moldings at once with a molding taking number of several times to several 10 times, with the same runner arrangement. The number of moldings which can be formed in single molding is increased, whereby the driving time of a molding machine can be reduced and reduction of the molding cost can be attained according to the present invention.

In case of performing mass production, the number of the molding machines can be reduced since the production per molding machine is increased.

In the method and the apparatus according to the inventions described in claims 2 and 12, the sphere series are supplied between the first and second rollers having different rotation speeds from the feeder, and individual spherical moldings are reliably parted from the sphere series between the first and second rollers. Therefore, the operation of parting the spherical moldings by a troublesome manual operation which has been required in general can be omitted, and it is possible to remarkably improve the efficiency of the operation for parting the sphere series into individual spherical moldings.

When the aforementioned structure of providing the specific carrier groove on the oscillatory type feeder is employed, the sphere series can be reliably carried along the coupling direction thereof, while the sphere series can be reliably supplied between the first and second rollers in a prescribed direction. Therefore, parting from the sphere series into the individual spherical moldings can be further reliably performed.

According to the structure of arranging the spherical molding container and the screen, further, the spherical moldings parted and obtained between the first and second rollers are reliably contained in the spherical molding container.

In the invention described in claim 5, further, the spherical moldings are ground through a powdery abrasive so that fine texture patterns are formed on the surfaces thereof, whereby absolutely no liquid such as a working fluid or a grinding liquid is required but only grinding chips adhering to the rotor of the apparatus or the container inner wall may be removed, and hence the number of times of a dressing treatment can be remarkably reduced, and the production efficiency can be remarkably improved.

In the invention described in claim 6, further, no dressing treatment is required even if grinding is performed without employing a liquid such as a working fluid or a grinding liquid, the spherical moldings are not broken by weight or impact of balls, and fine texture patterns can be formed on surfaces of various spherical moldings having different sizes.

Further, it is also possible to adjust the shapes and the depths of the texture patterns formed on the spherical moldings by properly selecting the hardness and the grain size of the aforementioned abrasive.

The bead working method and the apparatus of the inventions described in claims 6 and 15 are formed as described above, whereby no grinding chips etc. partially remain on the surfaces of the treated beads, it is not necessary to repeatedly carry out a troublesome washing operation, and screening can be performed in remarkably excellent working efficiency.

In the invention described in claim 14, further, the surface of the form block is previously roughened, so that the surface roughness is transferred to the surfaces of the finally obtained spherical moldings and spherical moldings having specific surface roughness are obtained. Therefore, although (1) there has been such a problem that grinding chips were generated since the carriers were directly ground in the grinding method, and (2) grains are generated also in the method of fixing grains to carriers, in the respective methods which have been employed for obtaining conventional carriers for body fluid component adsorption and for diagnostic reagents, generation of such grinding chips and particulates is not caused when the inventive method is employed. While (2) a problem of interaction with a specimen sample by an adhesive material has also been caused in the conventional method of fixing particulates to the carriers, interaction with body fluid components, a specimen sample etc. is not caused either since such an adhesive material is not employed in the present invention.

Thus, it is possible to stably provide spherical moldings, particularly carriers which are optimum as carriers for adsorption of body fluid components and for diagnostic medicines. Further, while (3) the material and the surface roughness have been restricted in the conventional method employing a porous material, carriers having desired surface roughness can be readily obtained in the inventive method by employing a proper injection-moldable material and controlling respective conditions.

We claim:

1. A method of preparing spherical moldings
   by preparing a plurality of spherical moldings,
   comprising arranging a bridge of 0.01 mm$^2$ to 10 mm$^2$ in sectional area for feeding molten resin between molding forming parts, injecting the molten resin into a form block for injection molding having a structure obtained by connecting a plurality of molding forming parts being coupled to one gate, being linked with at least one runner, through said bridge, performing molding to thereby obtain a sphere series in which spherical moldings are linked with each other, and
   parting the sphere series in which a plurality of said spherical moldings are coupled with each other, said parting the sphere series being carried out by employing first and second rollers having different rotation speeds and a feeder for supplying the sphere series between said first and second rollers, supplying the sphere series between the first and second rollers by said feeder, bringing said sphere series into contact with the first and second rollers having different rotation speeds, and parting said sphere series into individual spherical moldings.

2. The method of preparing spherical moldings in accordance with claim 1, wherein
   an oscillatory type feeder carrying said sphere series by being vibrated is employed as said feeder, and
   a carrier groove extending in a direction for carrying the sphere series, and having a width being larger than the diameter of the spherical moldings in the sphere series and smaller than twice said diameter is formed in said feeder.

3. The method of preparing spherical moldings in accordance with claim 1 or 2, characterized in that a screen passing individual spherical moldings therethrough but not passing a sphere series in which two or more spherical moldings are coupled with each other is arranged under said first and second rollers, for performing screening of individual spherical moldings obtained by parting the sphere series between the first and second rollers.

4. The method of preparing spherical moldings in accordance with claim 1, further comprising a step of providing fine texture patterns to individual spherical moldings obtained by parting the sphere series, said step of providing fine texture patterns being carried out by:

supplying said individual spherical moldings and a powdery abrasive being larger in hardness than said spherical moldings into a working space between a container having a substantially conical inner surface shape and a substantially conical rotor being inserted in said container, grinding the same while rotating at least either one of said rotor and container, and forming fine texture patterns on a surface of the individual spherical moldings.

5. The method of preparing spherical moldings in accordance with claim 1, further comprising a step of forming fine texture patterns on surfaces of said individual spherical moldings obtained by parting the sphere series, said step of forming fine texture patterns being carried out by filling the individual spherical moldings and powder being larger in hardness than said spherical moldings and having a maximum grain size being measured in accordance with JIS R6010 of not more than 110 μm as an abrasive into a pot of a ball mill apparatus, and rotating said pot thereby forming fine texture patterns on the surfaces of the individual spherical moldings.

6. The method of preparing spherical moldings in accordance with claim 4 or 5, further comprising a step of separating the individual spherical moldings and the abrasive from each other after forming the fine texture patterns on surfaces of the individual spherical moldings, said step of separating said individual spherical moldings and the abrasive from each other being carried out by supplying the individual spherical moldings having the abrasive adhering to the surfaces into a hopper being provided with a screen part for separating said individual spherical moldings and the abrasive from each other and rocking said hopper with the screen part, said screen part comprising meshes being smaller than the diameter of the individual spherical moldings and larger than the diameter of abrasive grains, the space of a passage reaching a mesh surface of the screen part from an introduction part of said hopper being rendered 1.1 to 1.8 times the diameter of the individual spherical moldings.

7. The method of preparing spherical moldings in accordance with claim 1, providing specific surface roughness to said form block for injection molding and injection-molding the resin through the form block being provided with said surface roughness.

8. The method of preparing spherical moldings in accordance with claim 7, wherein said surface roughness is rendered in such a range that the center-line mean roughness Ra value is 0.01 to 30 μm.

9. The method of preparing spherical moldings in accordance with any one of claims 1, 2, 4, 5, 7, and 8, wherein said spherical moldings are carriers for at least one of adsorption of body fluid components and diagnostic reagents.

* * * * *

UNITED STATES PATENT AND TRADEMARK OFFICE
CERTIFICATE OF CORRRECTION

PATENT NO. : 5,792,406  
DATED : August 11, 1998  
INVENTOR(S) : Wada et al.

Page 1 of 2

It is certified that error appears in the above-identified patent and that said Letters Patent is hereby corrected as shown below:

Title page, item item [56] insert the following:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 42 | 0 | 42 | 8 | 5 | A | 1 | 2/13/92 | Germany | | | | |
| | | 32 | 4 | 46 | 1 | 2 | A | 1 | 6/7/84 | Germany | | | | |
| | | | | | | | | | | | | | | |

UNITED STATES PATENT AND TRADEMARK OFFICE
CERTIFICATE OF CORRRECTION

PATENT NO. : 5,792,406
DATED      : August 11, 1998
INVENTOR(S): Wada et al.

Page 2 of 2

It is certified that error appears in the above-identified patent and that said Letters Patent is hereby corrected as shown below:

Title page, item item [56] insert the following:

OTHER DOCUMENTS

|   |   |
|---|---|
|   | Patent Abstracts of Japan, Vol. 11, No. 95, March 25, 1987 & JP 61-247038A. |
|   | Patent Abstracts of Japan, Vol. 7, No. 59, March 11, 1983 & JP 57-203532A. |
|   | Patent Abstracts of Japan, Vol. 12, No. 347, September 19, 1988 & 63-107532A. |
|   | Patent Abstracts of Japan, Vol. 17, No. 607, November 9, 1993 & JP 05-185455A. |
|   |   |

Signed and Sealed this

Thirteenth Day of April, 1999

Attest:

Q. TODD DICKINSON

Attesting Officer

Acting Commissioner of Patents and Trademarks